United States Patent
Wilson

(10) Patent No.: US 9,856,966 B2
(45) Date of Patent: Jan. 2, 2018

(54) DRIVETRAIN ASSEMBLY FOR A WIND TURBINE

(71) Applicant: General Electric Company, Schenectady, NY (US)

(72) Inventor: Ian David Wilson, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 484 days.

(21) Appl. No.: 14/469,659

(22) Filed: Aug. 27, 2014

(65) Prior Publication Data
US 2016/0061191 A1 Mar. 3, 2016

(51) Int. Cl.
| F16H 57/00 | (2012.01) |
| F03D 80/80 | (2016.01) |
| F03D 15/00 | (2016.01) |
| F03D 9/25 | (2016.01) |
| F16H 1/28 | (2006.01) |

(52) U.S. Cl.
CPC ............ *F16H 57/0006* (2013.01); *F03D 9/25* (2016.05); *F03D 15/00* (2016.05); *F03D 80/88* (2016.05); *F05B 2260/40311* (2013.01); *F16H 1/28* (2013.01); *Y02E 10/722* (2013.01); *Y02E 10/725* (2013.01); *Y02E 10/726* (2013.01)

(58) Field of Classification Search
CPC .............................. F16H 57/0006; F03D 9/25
See application file for complete search history.

(56) References Cited

U.S. PATENT DOCUMENTS

| 5,323,663 | A | * | 6/1994 | Ohgi | ................. F02N 15/046 310/83 |
| 5,905,310 | A | * | 5/1999 | Nagao | ................. F02N 15/046 290/36 R |
| 6,664,652 | B2 | * | 12/2003 | Chane-Waye | ........ F02N 15/046 290/38 R |
| 7,281,442 | B2 | * | 10/2007 | Chane-Waye | ............ F16D 3/68 74/411 |

(Continued)

FOREIGN PATENT DOCUMENTS

EP          2 354 544 A1    8/2011

*Primary Examiner* — Derek D Knight
(74) *Attorney, Agent, or Firm* — Dority & Manning, P.A.

(57) ABSTRACT

The present disclosure is directed to a drivetrain assembly for a wind turbine. The drivetrain assembly includes a gearbox having a ring gear, an annular torque support, and at least one flexible component configured therebetween. More specifically, the ring gear includes opposing inner and outer circumferential surfaces separated by side circumferential edges. The side circumferential edges include a rotor-side edge and a generator-side edge. The rotor-side edge has a first set of circumferentially-spaced teeth. The torque support has a generator-side surface having a second set of circumferentially-spaced teeth. Thus, the first set of teeth of the ring gear are configured to engage the second set of teeth of the torque support so as to couple the ring gear to the torque support. In addition, the flexible component is configured between the first and second sets of teeth so as to control vibrations in the wind turbine, e.g. transmission of gearbox-generated vibrations. Thus, location of the flexible components allows for improved bedplate stiffness of the wind turbine.

12 Claims, 13 Drawing Sheets

(56) References Cited

U.S. PATENT DOCUMENTS

| | | | |
|---|---|---|---|
| 7,871,084 B2* | 1/2011 | Hakui | B60G 7/006 |
| | | | 280/5.521 |
| 8,033,951 B2 | 10/2011 | Pischel | |
| 8,632,437 B2 | 1/2014 | Dinter et al. | |
| 2008/0308980 A1 | 12/2008 | Mitsch | |
| 2011/0094333 A1* | 4/2011 | Chane-Waye | F16D 3/68 |
| | | | 74/7 E |
| 2012/0076652 A1 | 3/2012 | Ventzke et al. | |
| 2013/0152581 A1* | 6/2013 | Lofgren | F02B 37/105 |
| | | | 60/605.1 |
| 2013/0302144 A1* | 11/2013 | Demtroder | F03D 9/002 |
| | | | 415/124.2 |
| 2014/0037456 A1 | 2/2014 | Erno et al. | |
| 2014/0319764 A1* | 10/2014 | Saito | F16D 3/12 |
| | | | 271/258.01 |
| 2015/0367880 A1* | 12/2015 | Chae | B62D 5/04 |
| | | | 74/498 |

\* cited by examiner

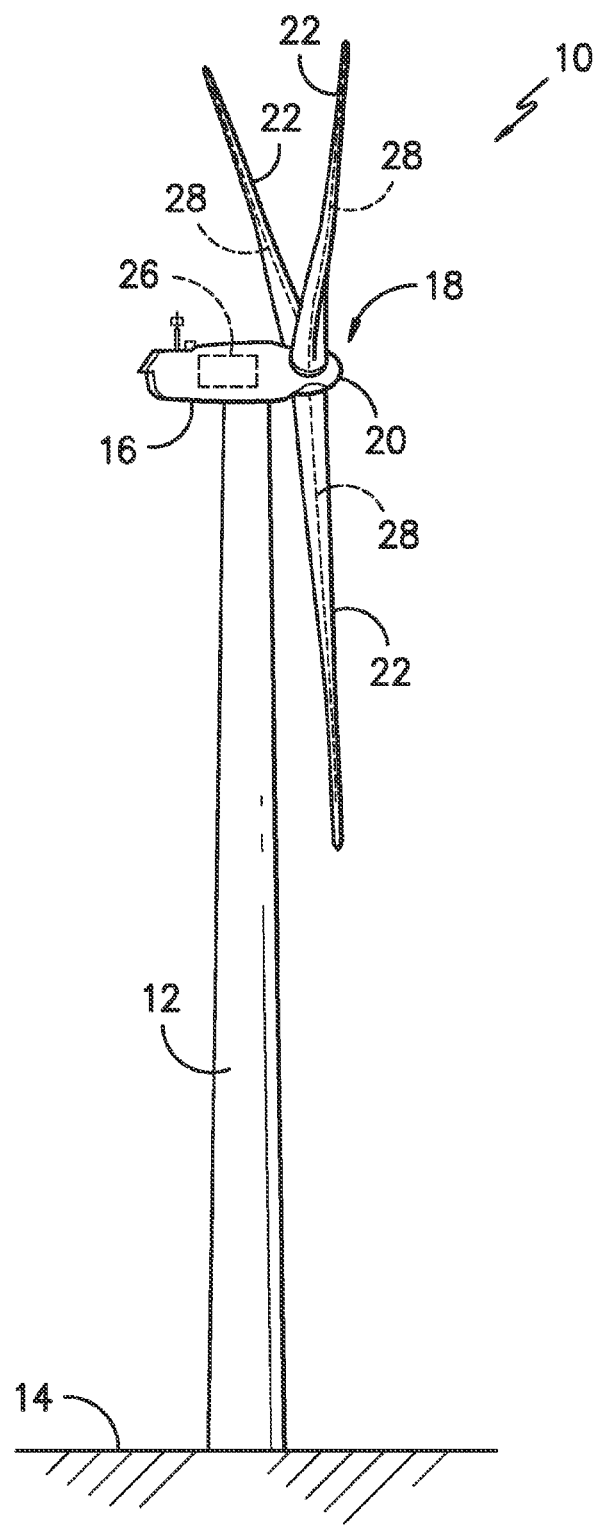
FIG. -1-

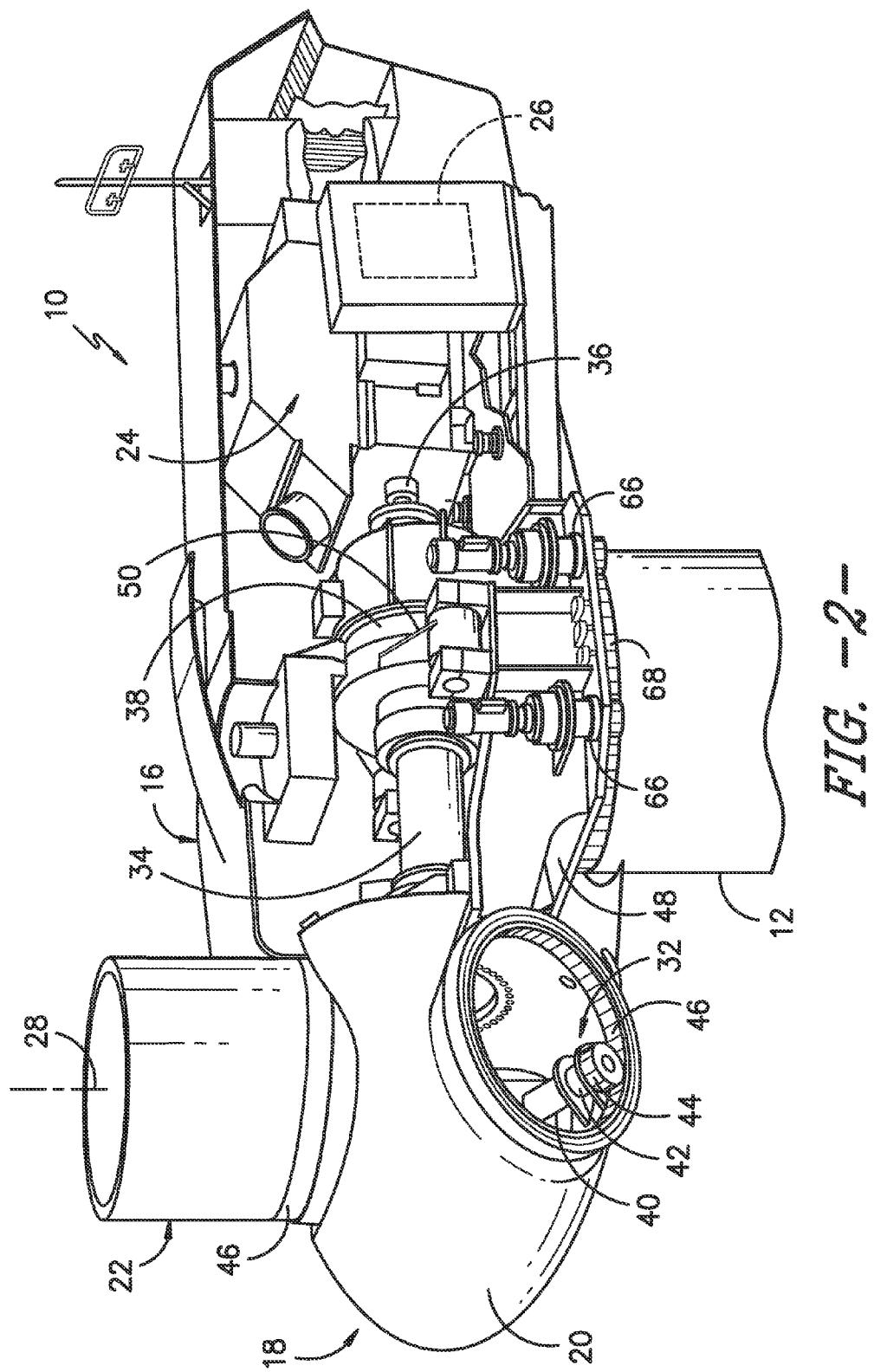
FIG. -2-

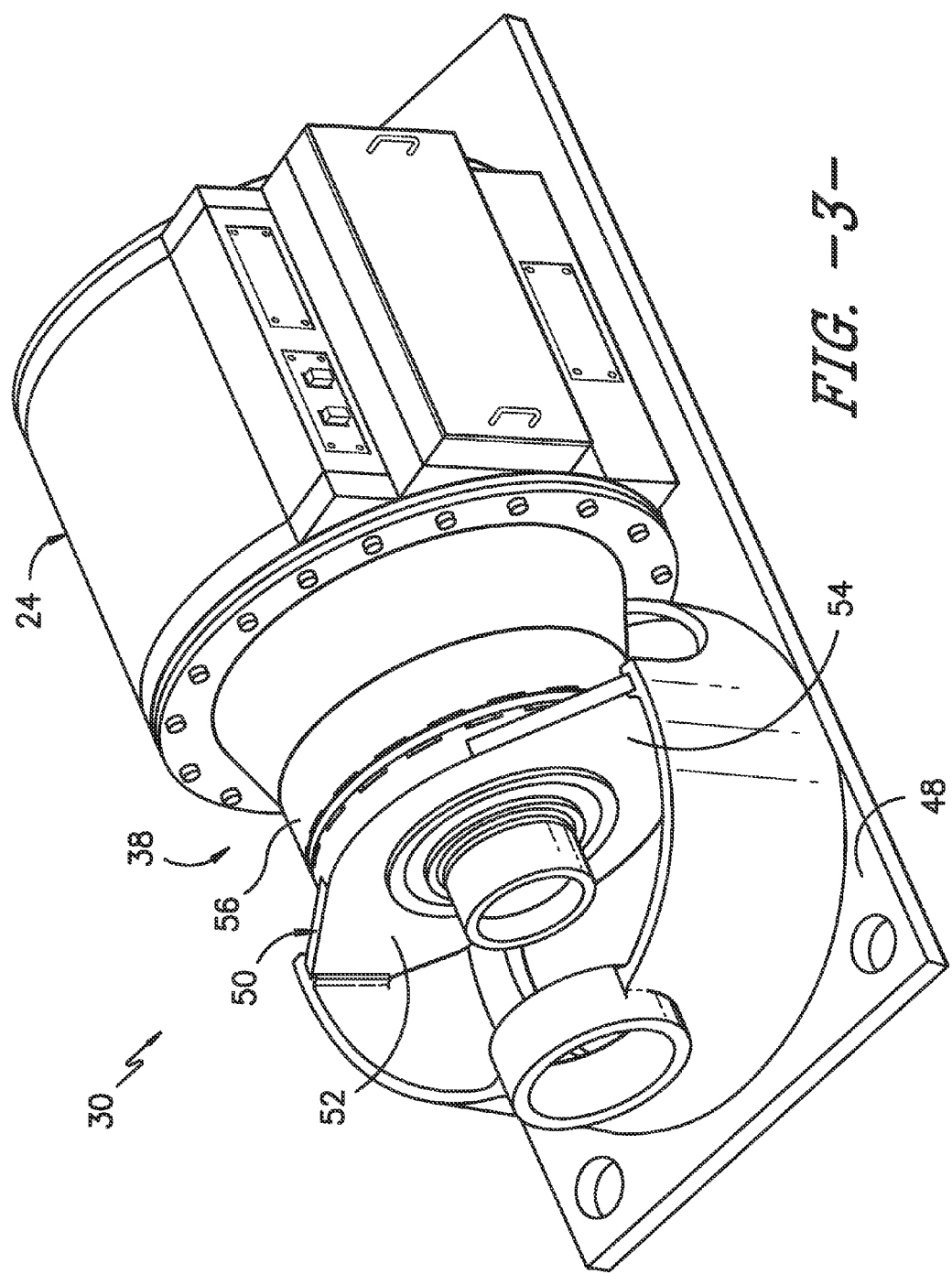

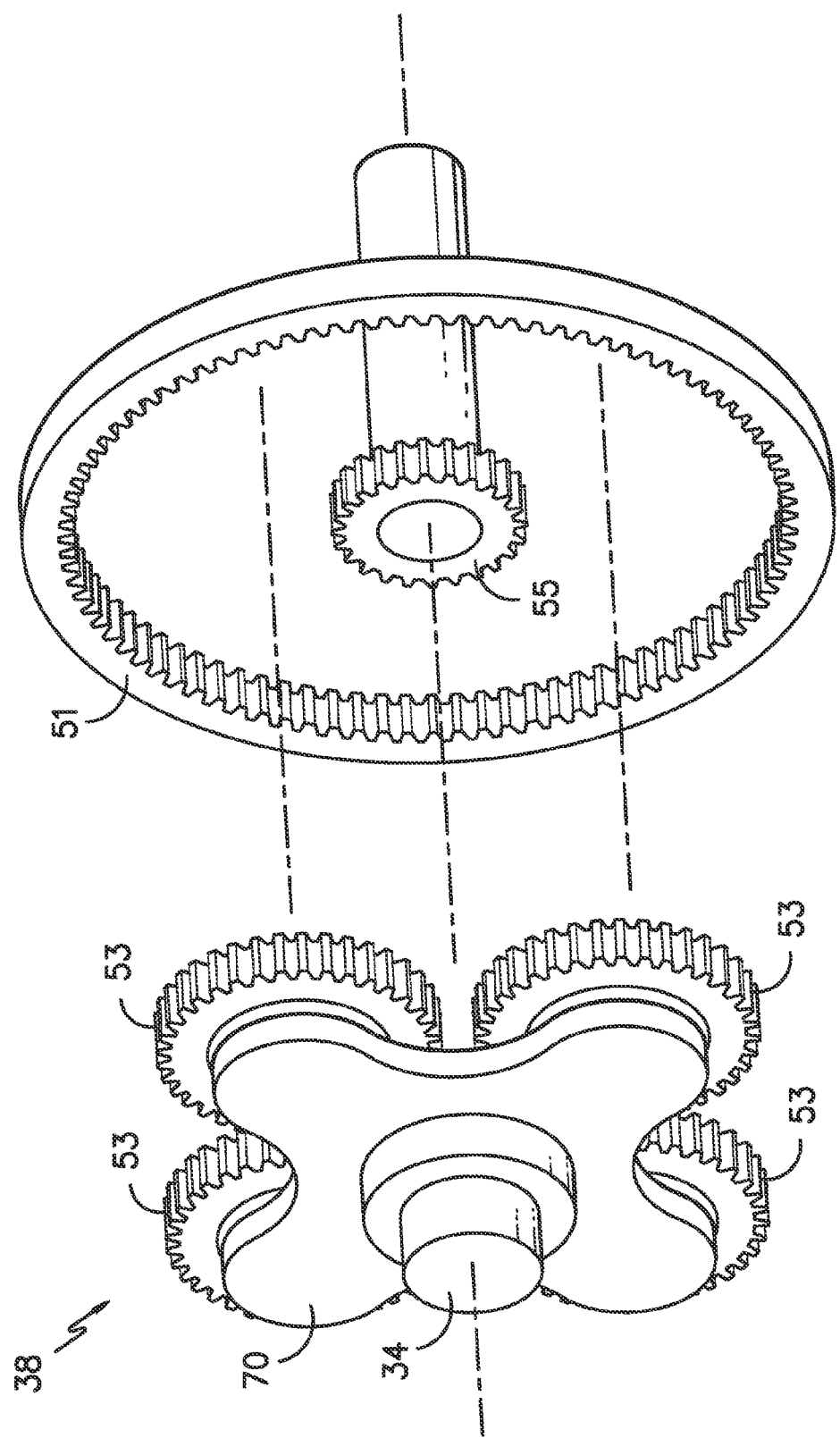
FIG. -4-

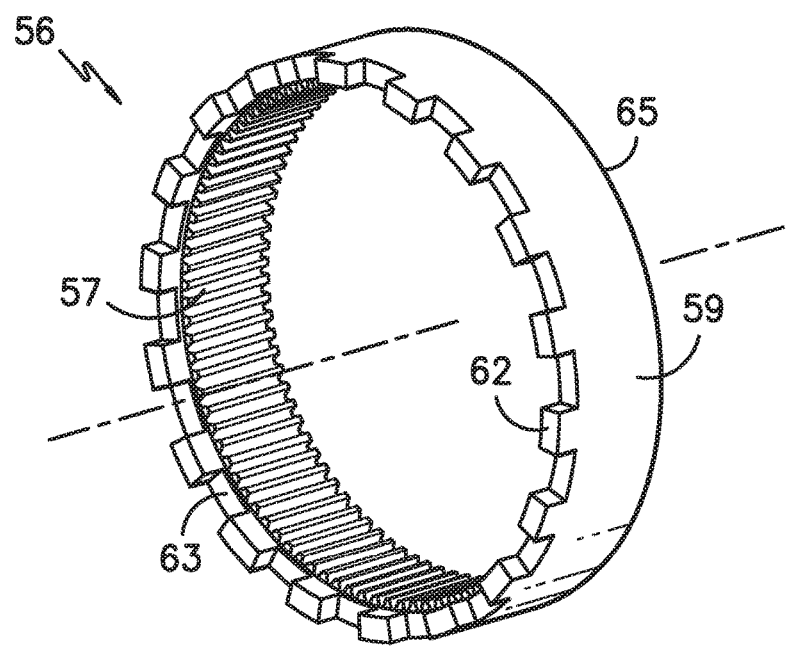
FIG. -5-
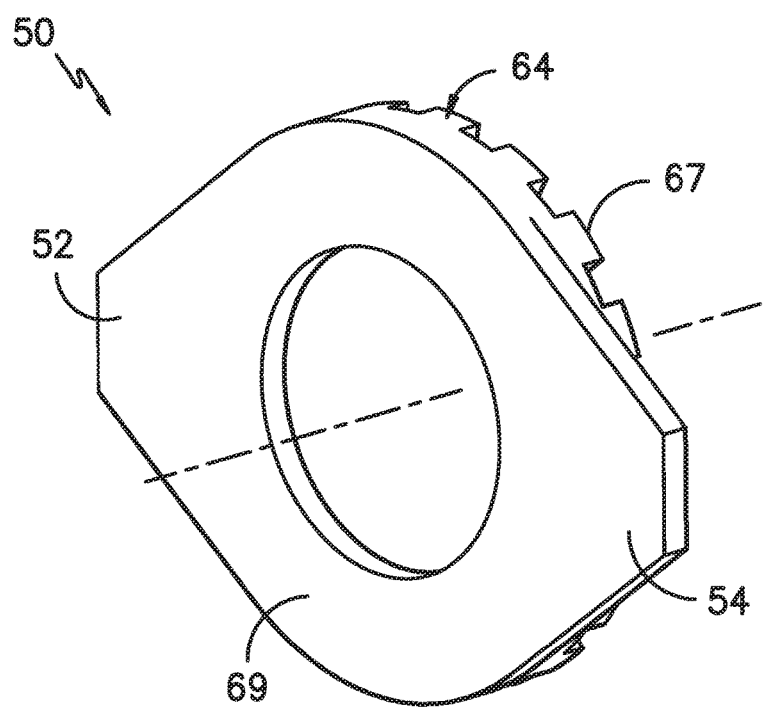
FIG. -6-

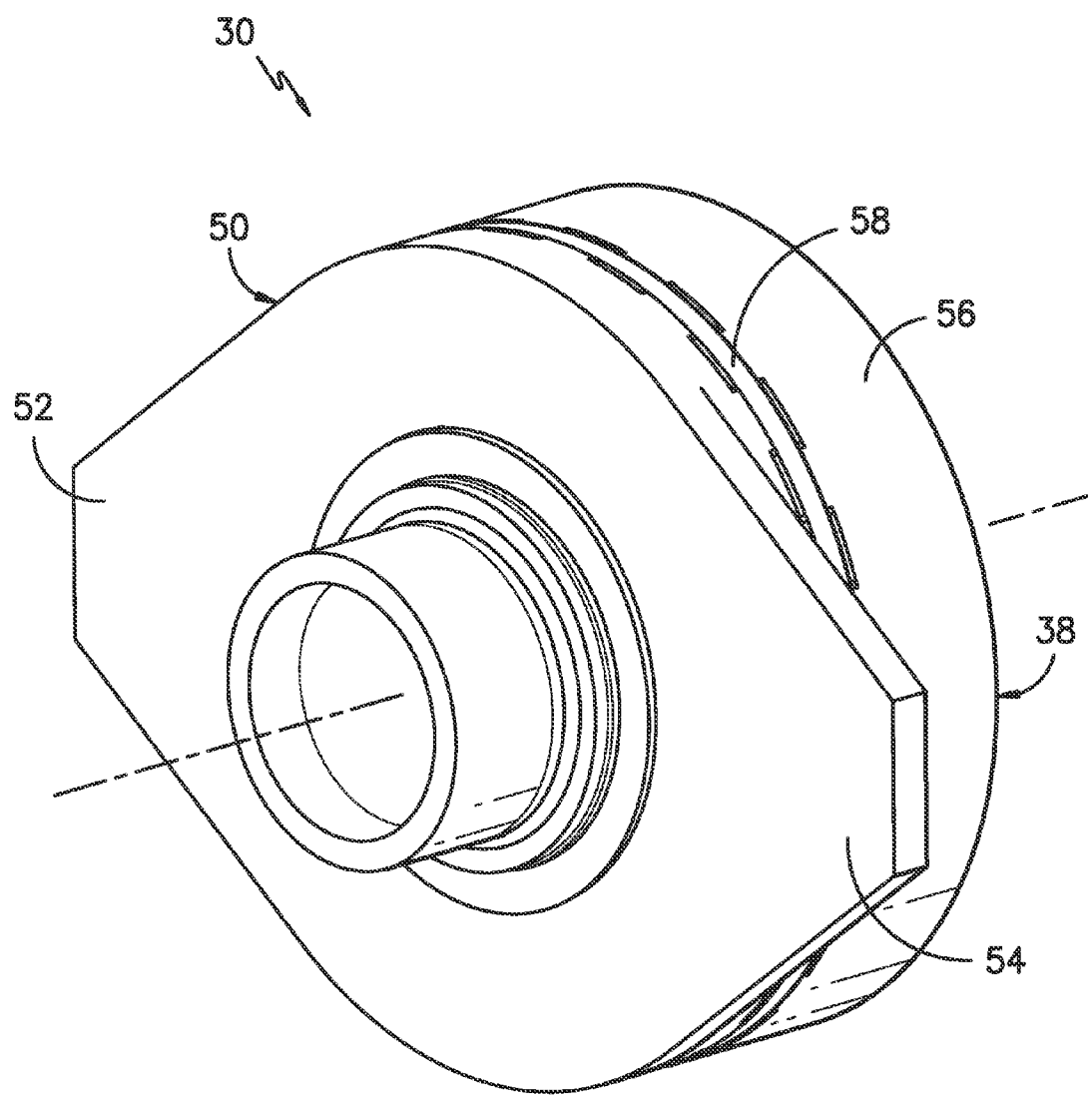
FIG. -7-

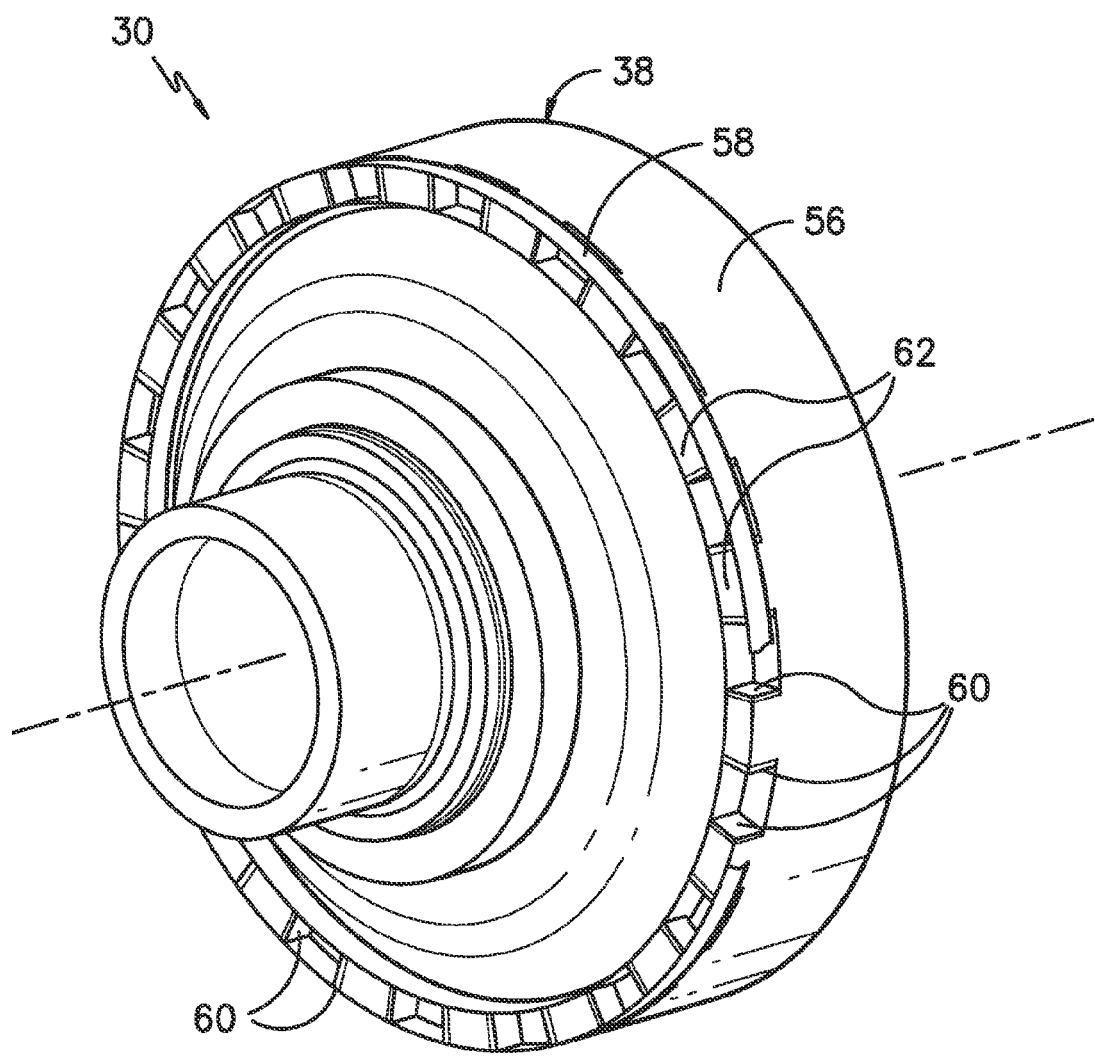
FIG. -8-

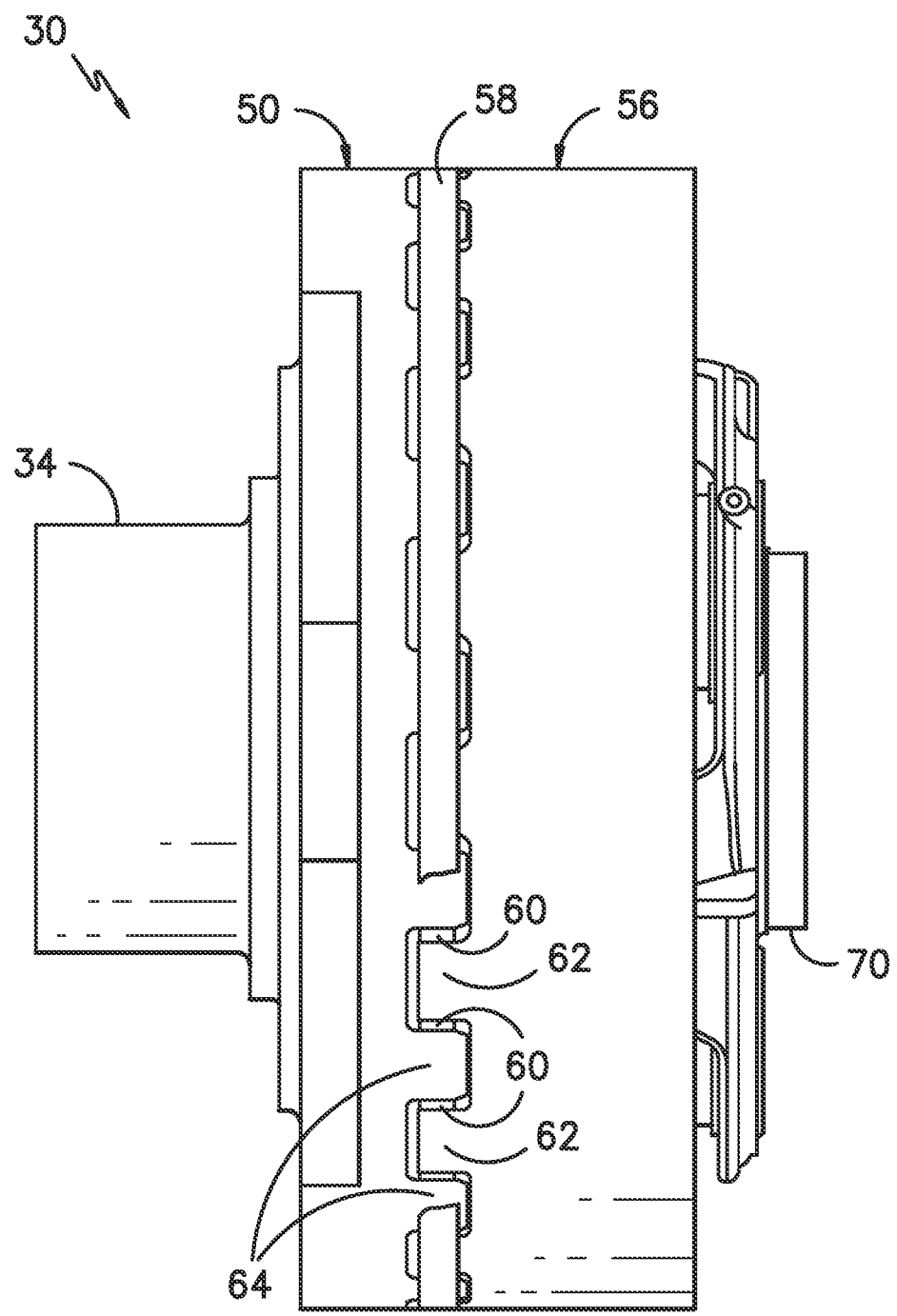
FIG. -9-

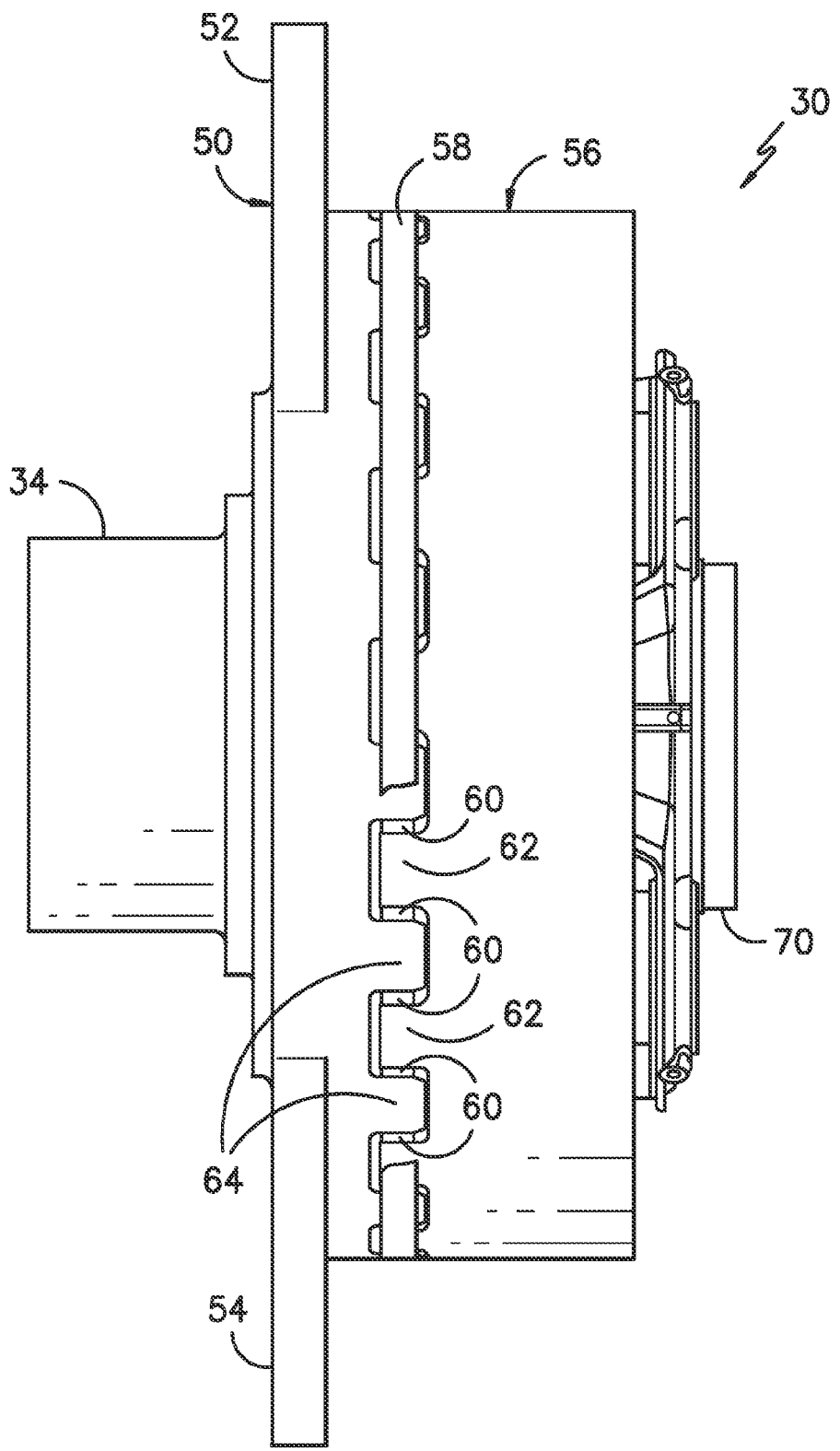
FIG. -10-

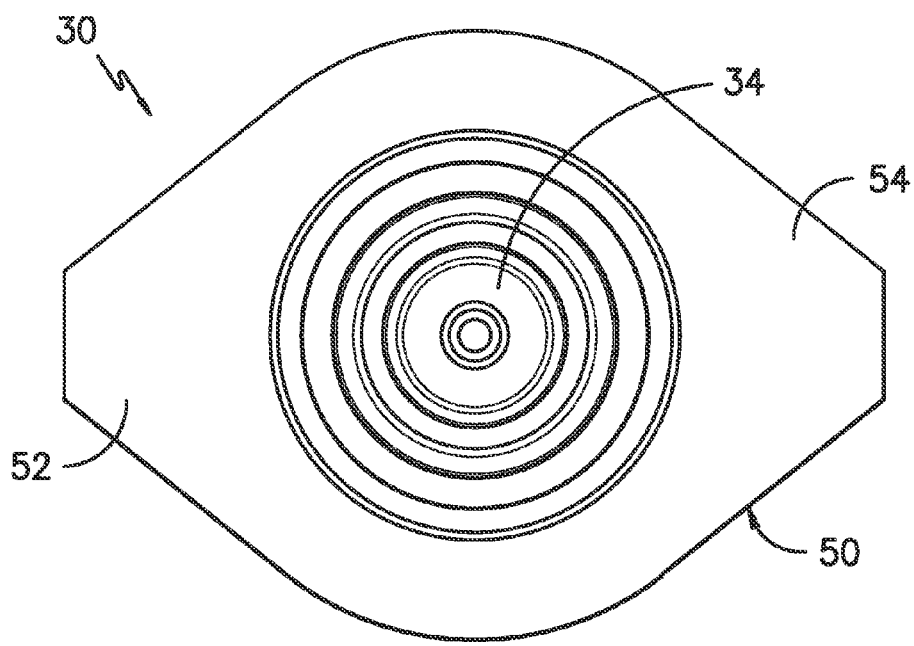
FIG. -11-
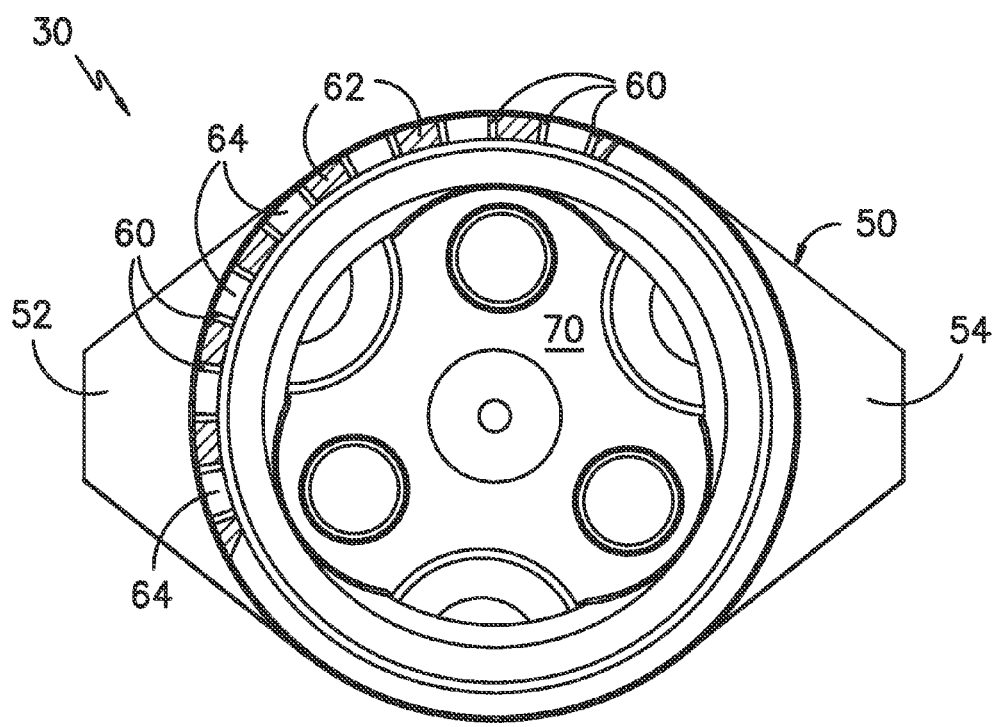
FIG. -12-

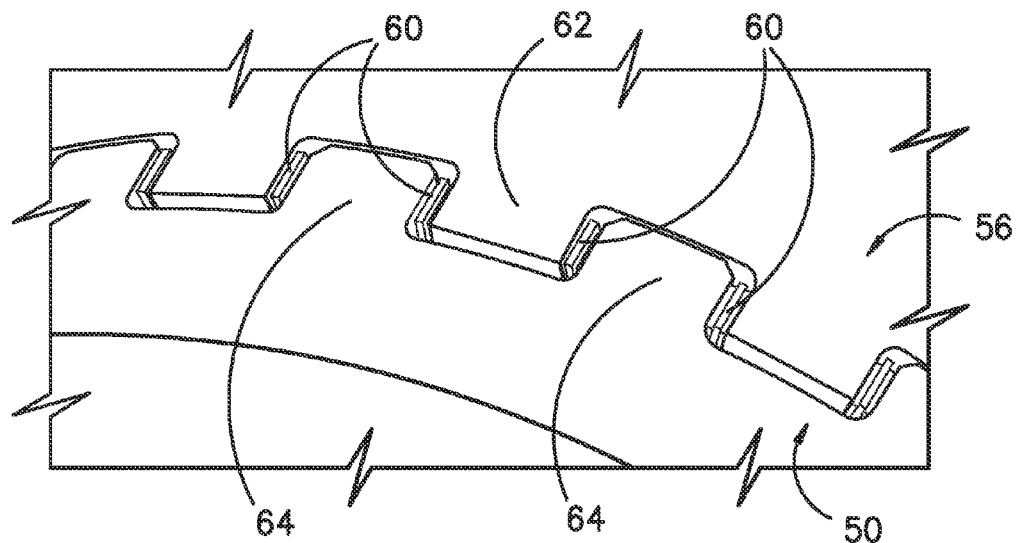
FIG. -13-
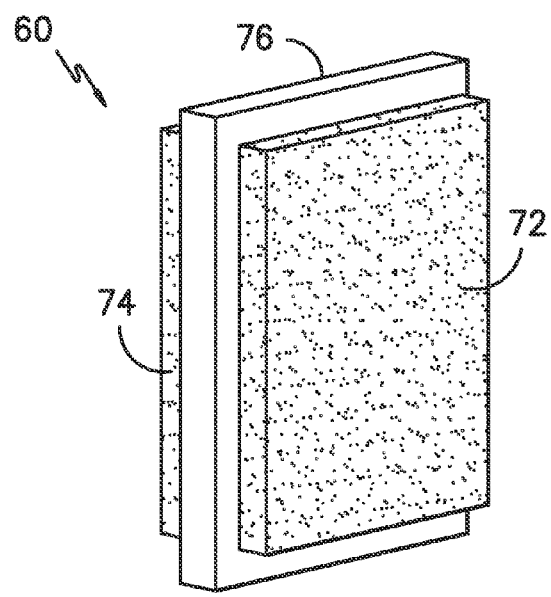
FIG. -14-

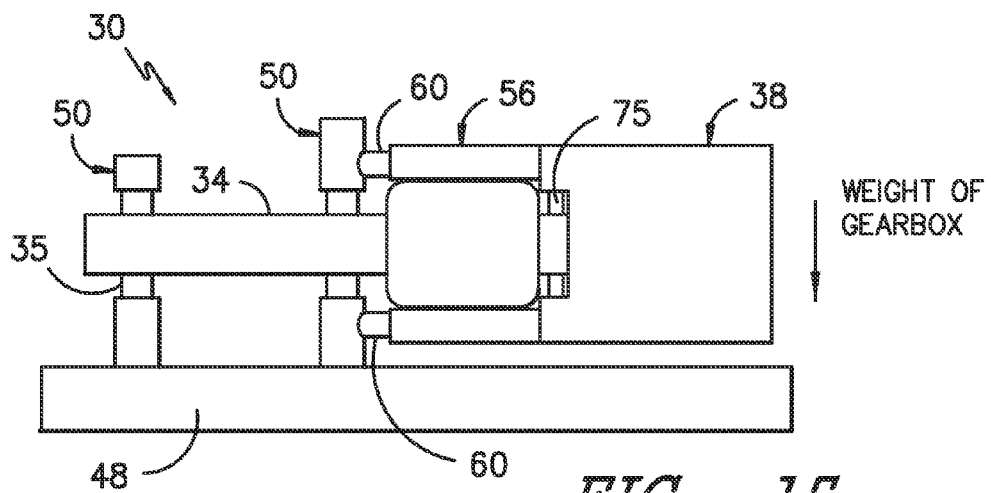
FIG. -15-
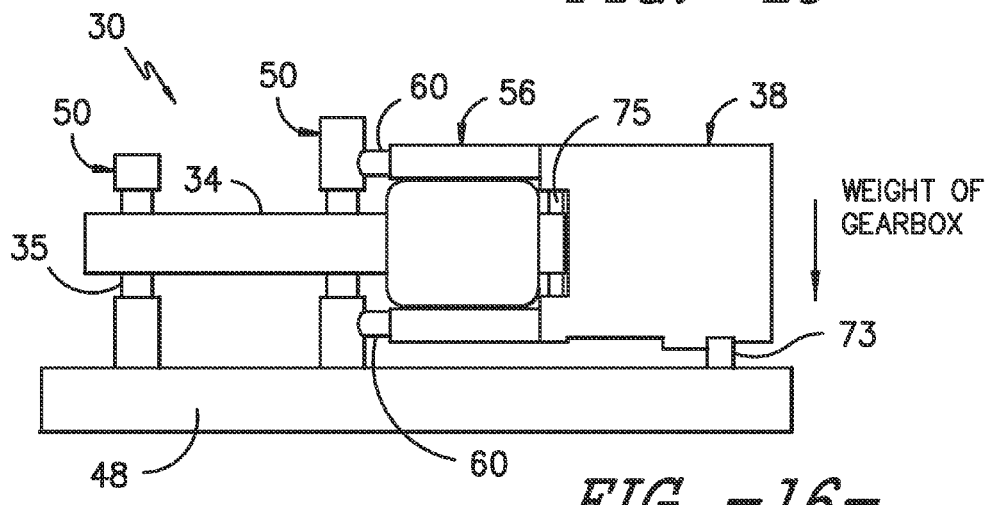
FIG. -16-
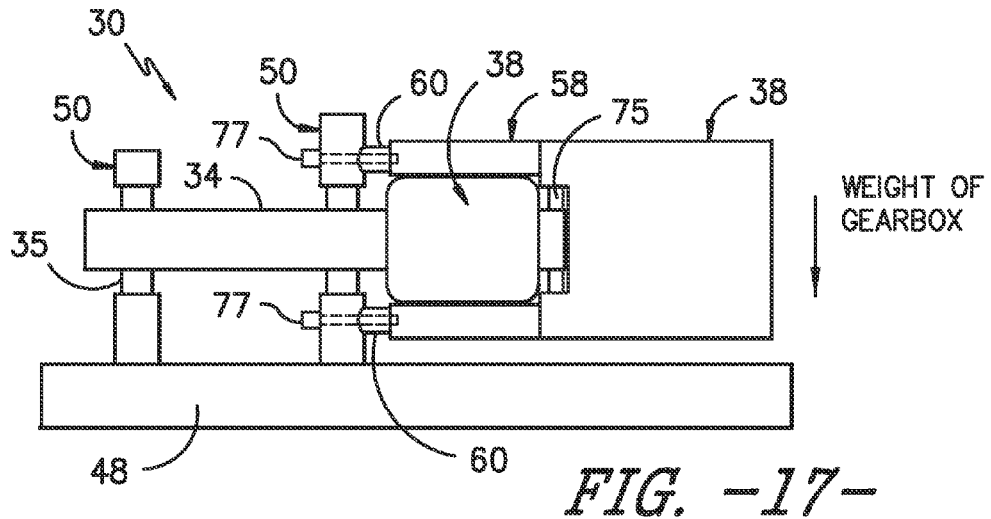
FIG. -17-

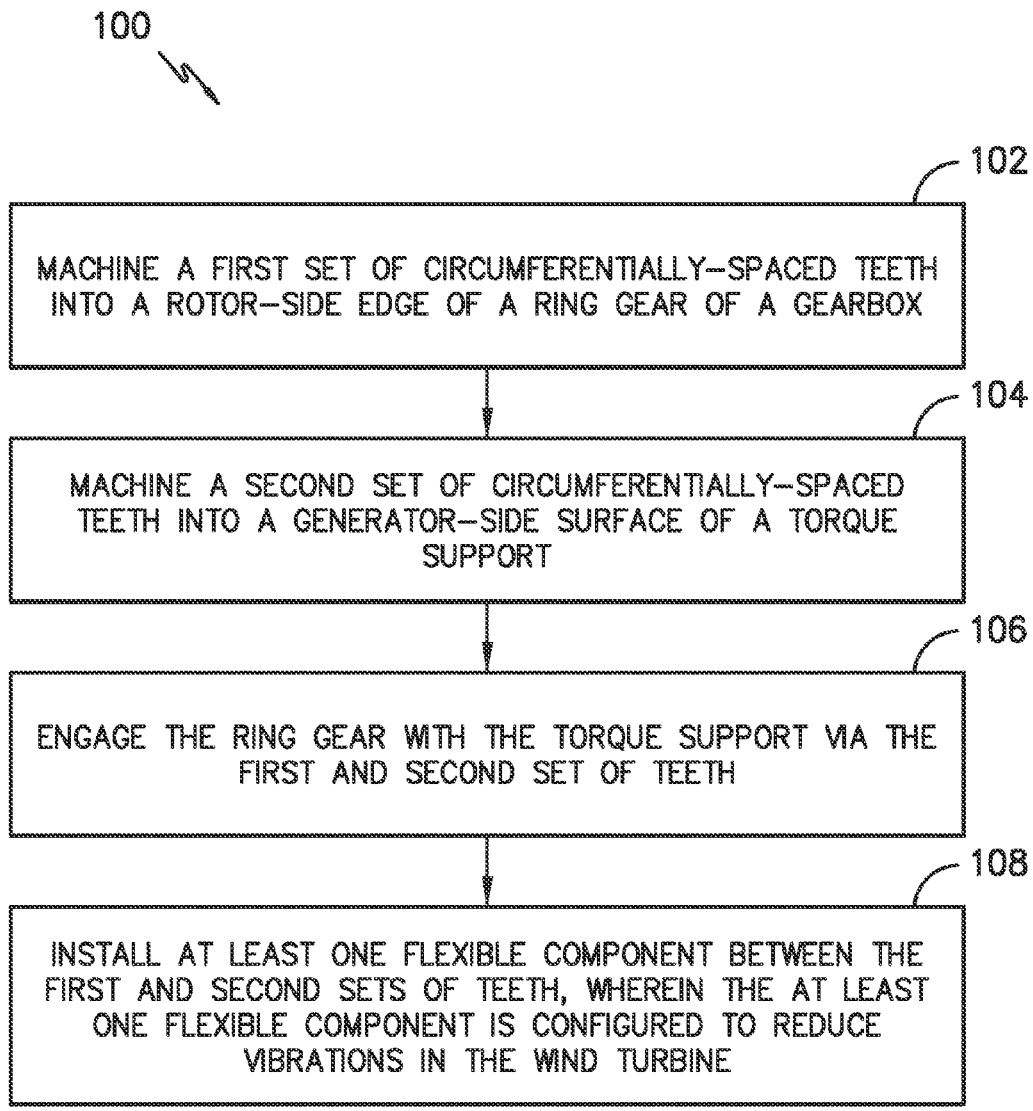
FIG. -18-

DRIVETRAIN ASSEMBLY FOR A WIND TURBINE

FIELD OF THE INVENTION

The present disclosure relates in general to wind turbines, and more particularly to a drivetrain assembly for a wind turbine having improved bedplate stiffness while controlling gearbox-generated vibrations.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the turbine blades, which spin a low speed shaft. The low speed shaft is coupled to an input shaft of a gearbox, which has a higher speed output shaft connected to a generator. Thus, the geared drivetrain aims to increase the velocity of the mechanical motion. The gearbox and the generator are typically separately mounted to the bedplate. More specifically, the output shaft of the gearbox and the input shaft of the generator are separately supported by gearbox bearings and generator bearings, respectively. Thus, the gearbox and corresponding input shaft are typically mounted to the bedplate via one or more torque arms.

Over time, normal operating loads and forces from the wind act on the wind turbine components described above and can subject the components to various vibrations, deformations, distortions, and/or pitch movements. Thus, the drivetrain of a modern wind turbine is typically mounted to the bedplate with one or more elastic components configured therebetween so as to absorb various forces and vibrations acting on the wind turbine in an effort to prevent damage. For example, in certain configurations, modern wind turbines may include one or more large elastic components configured between the torque arm of the gearbox and the bedplate. Though this configuration is configured to reduce vibrations in the drivetrain, it may not provide optimal stiffness of the bedplate since the gearbox and the generator are separately mounted to the bedplate via one or more torque arms.

Thus, a new and improved system and method directed to improving bedplate stiffness that also controls vibrations and transmission of such vibrations in a wind turbine, e.g. gearbox-generated vibrations, would be welcomed in the art. Accordingly, the present subject matter is directed to a system and method having one or more flexible components configured between the torque arm and the ring gear of the gearbox so as to improve bedplate stiffness and control the aforementioned vibrations.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a drivetrain assembly for a wind turbine. The drivetrain assembly includes a gearbox having a ring gear, an annular torque support, and at least one flexible component configured therebetween. More specifically, the ring gear includes opposing inner and outer circumferential surfaces separated by side circumferential edges. The side circumferential edges include a rotor-side edge and a generator-side edge. The rotor-side edge has a first set of circumferentially-spaced teeth. The torque support has a generator-side surface having a second, corresponding set of circumferentially-spaced teeth. Thus, the first set of teeth of the ring gear is engaged with the second set of teeth of the torque support. In addition, one or more flexible components are configured between the first and second sets of teeth so as to control vibrations in the wind turbine, e.g. gearbox-generated vibrations. Further, the location of the flexible components allows for improved bedplate stiffness of the wind turbine.

In one embodiment, the flexible component(s) are configured between adjacent side walls of adjacent teeth of the engaged first and second sets of teeth. In another embodiment, the drivetrain assembly may also include a retaining member configured around the engaged first and second sets of teeth so as to radially retain the flexible component(s) between the first and second sets of teeth. For example, in one embodiment, the retaining member may correspond to a circumferential band wrapped around the engaged first and second sets of teeth.

In yet another embodiment, the drivetrain assembly may include a bedplate support frame configured to support the gearbox and the torque support. More specifically, in one embodiment, the torque support may be integral with the bedplate support frame so as to further stiffen the bedplate support frame. In further embodiments, the drivetrain assembly may further include an additional load-bearing component configured to support axial loads of the drivetrain assembly and/or a weight of the gearbox. For example, in certain embodiments, the load-bearing component may include a down-wind bearing, one or more elastomers configured between the gearbox and bedplate support frame, one or more axial bolts passing through the torque support and the ring gear, and/or any other suitable component configured to support such loads.

In certain embodiments, the flexible component(s) may have a substantially rectangular shape. In additional embodiments, the flexible component(s) may have any suitable shape so as to fit between and correspond to the first and second sets of teeth. Further, the flexible component(s) are generally constructed of an elastic material, e.g. a rubber, an elastomeric, or similar.

In further embodiments, each of the flexible component(s) may include a core member sandwiched between two elastic members, wherein each elastic member is constructed of a different elastic material. Further, the core member may be constructed of a metallic or metallic alloy material, such as e.g. steel, aluminum, brass, nickel, titanium, or similar. In addition, the core member may define a first surface area and each of the elastic members may define a second surface area, wherein the first surface area is greater than the second surface area.

In another aspect, the present disclosure is directed to a method for assembling a drivetrain assembly for a wind turbine. The method includes machining a first set of circumferentially-spaced teeth into a rotor-side edge of a ring gear of a gearbox. Another step of the method includes machining a second set of circumferentially-spaced teeth into a generator-side surface of a torque support. A next step of the method includes engaging the first set of teeth of the ring gear with the second set of teeth of the torque support. The method also includes installing at least one flexible component between the first and second sets of teeth, wherein the at least one flexible component is configured to control vibrations in the wind turbine, e.g. gearbox-generated vibrations. Thus, the location of the flexible component(s) allows for improved bedplate stiffness of the wind turbine.

In one embodiment, the step of installing the at least one flexible component between the first and second sets of teeth may also include installing the flexible component between adjacent side walls of adjacent teeth of the engaged first and second sets of teeth. In another embodiment, the method may also include installing a plurality of flexible components between the first and second sets of teeth.

In a particular embodiment, the step of installing a plurality of flexible components between the first and second sets of teeth may also include: rotating the ring gear relative to the torque support in a first direction so as to create a plurality of first gaps between the first and second sets of teeth, installing a first set of the plurality of flexible components within the first gaps, rotating the ring gear relative to the torque support in an opposite second direction so as to create a plurality of second gaps between the first and second sets of teeth, and installing a second set of the flexible components within the second gaps. In addition, the step of rotating the ring gear relative to the torque support in an opposite second direction may also include compressing the installed first set of flexible components.

In a further embodiment, the method may also include installing a retaining member, e.g. a band, around the engaged first and second sets of teeth so as to radially retain the at least one flexible component between the first and second sets of teeth. In another embodiment, the method may include mounting the engaged ring gear and torque support to a bedplate support frame of the wind turbine. In an alternative embodiment, the torque support may be integral with a bedplate support frame of the wind turbine when the ring gear is engaged with the torque support.

In yet another aspect, the present disclosure is directed to a wind turbine. The wind turbine includes a tower, a nacelle mounted atop the tower, a rotor, a gearbox positioned within the nacelle and having a ring gear, a rotor shaft rotatably coupling the rotor to the gearbox, a bedplate support frame configured to support the gearbox and the rotor shaft, an annular torque support engaged with the gearbox and configured atop the bedplate support frame, and a plurality of flexible components configured to reduce vibrations in the wind turbine. More specifically, the ring gear includes opposing inner and outer circumferential surfaces separated by side circumferential edges. The side circumferential edges include a rotor-side edge and a generator-side edge. The rotor-side edge has a first set of circumferentially-spaced teeth. In addition, the torque support includes a rotor-side surface and a generator-side surface. The generator-side surface includes a second set of corresponding circumferentially-spaced teeth. Thus, the first set of teeth of the ring gear engages the second set of teeth of the torque support. In addition, the flexible components are configured between the first and second sets of teeth so as to control vibrations in the wind turbine, e.g. gearbox-generated vibrations. Further, the location of the flexible components allows for improved bedplate stiffness of the wind turbine. It should be understood that the flexible components may include any one of or combination of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to one embodiment of the present disclosure;

FIG. 2 illustrates a perspective view of a simplified, internal view of one embodiment of a nacelle of a wind turbine according to the present disclosure;

FIG. 3 illustrates a perspective view of one embodiment of a drivetrain assembly according to the present disclosure;

FIG. 4 illustrates a perspective view of one embodiment of a gear system particularly illustrating a ring gear according to conventional construction;

FIG. 5 illustrates a perspective view of one embodiment of a ring gear according to the present disclosure;

FIG. 6 illustrates a perspective view of one embodiment of a torque support according to the present disclosure;

FIG. 7 illustrates a perspective view of one embodiment of a drivetrain assembly according to the present disclosure, particularly illustrating the torque support engaged with the ring gear via first and second sets of teeth;

FIG. 8 illustrates a perspective view of one embodiment of a drivetrain assembly according to the present disclosure, wherein the torque support has been removed to further illustrate various internal components of the ring gear;

FIG. 9 illustrates a side view of the drivetrain assembly of FIG. 7;

FIG. 10 illustrates a top view of the drivetrain assembly of FIG. 7;

FIG. 11 illustrates a front view of the drivetrain assembly of FIG. 7 as viewed from the rotor;

FIG. 12 illustrates a back view of the drivetrain assembly of FIG. 7 as viewed from the generator;

FIG. 13 illustrates a detailed, perspective view of one embodiment of the engaged first and second sets of teeth according to the present disclosure;

FIG. 14 illustrates a detailed, perspective view of one embodiment of a flexible component according to the present disclosure;

FIG. 15 illustrates a side view of one embodiment of the drivetrain assembly, particularly illustrating a down-wind bearing so as to support axial loads and/or the gearbox weight according to the present disclosure;

FIG. 16 illustrates a side view of another embodiment of the drivetrain assembly, particularly illustrating an additional elastomer between the gearbox and the bedplate support frame so as to support axial loads and/or the gearbox weight according to the present disclosure;

FIG. 17 illustrates a side view of another embodiment of the drivetrain assembly, particularly illustrating axial bolts passing through the torque support and the ring gear of the gearbox so as to support axial loads and/or the gearbox weight according to the present disclosure; and FIG. 18 illustrates a flow diagram of one embodiment of a method for assembling a drivetrain assembly of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a drivetrain assembly for a wind turbine having improved bedplate stiffness and controlled transmissions of gearbox-generated vibrations. The drivetrain assembly includes a gearbox having a ring gear configured with a torque support via a plurality of gear-type teeth so as to transmit torque. In addition, the assembly includes at least one flexible component configured between the gear teeth to reduce transmission of gearbox-generated vibrations into the wind turbine. As used herein, the term "flexible" is meant to encompass its ordinary broad meaning. For example, the flexible components as described here are capable of being bent, yielded, adapted, compressed, or similar and subsequently returning to their original shape. Further, the flexible component(s) can be designed so as to achieve desired properties for both fatigue and extreme loading of the wind turbine.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38 connected to a bedplate support frame 48 by a torque support 50. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Referring now to FIG. 3, a perspective view of the drivetrain assembly 30 in accordance with an embodiment of the present invention is illustrated. As shown, the drivetrain assembly 30 is supported atop the bedplate support frame 48, which is in turn mounted on the nacelle 16 (shown in FIG. 1). Further, as mentioned, the drivetrain assembly 30 generally includes gearbox 38 and generator 24. Further, as shown, the gearbox 38 is secured to the bedplate support frame 48 via the torque support 50. As mentioned, in certain embodiments, the torque support 50 may be integral with the bedplate support frame 48 (as shown in FIG. 3). More specifically, the torque support 50 may include a first torque arm 52 and a second torque arm 54 configured at sides of the gearbox 38 that are integral with the bedplate support frame 48. Such an embodiment provides increased stability to the bedplate support frame 48. Thus, when loads are applied to the bedplate support frame 48, the integral torque support 50 can help to minimize twisting or bending of the bedplate support frame 48. In addition, the integral torque support 50 also allows stiffening of the bedplate support frame 48, thus further allowing reduced mass of the bedplate support frame 48. Further, the torque load path into the bedplate support frame 48 will be better distributed circumferentially, providing for a more consistent gear mesh (hence less gear wear) around the circumference of the gearbox 38. In alternative embodiments, the torque support 50 may also be separately attached to the bedplate support frame 48 using conventional methods.

Referring now to FIG. 4, the gearbox 38 may be any suitable gear assembly that uses one or more gears and/or gear trains to provide speed and/or torque conversions from the rotor shaft 34 to the generator 24. For example, as shown, the gearbox 38 may include a gear system having one or more outer or planet gears 53 revolving about a central or sun gear 55. In addition, the planet gears 53 are typically mounted on a movable arm or carrier 70 which itself may rotate relative to the sun gear 55. The gearbox 38 may also include at least one outer ring gear 51 configured to mesh the planet gears 53. Thus, a typical ring gear 51, such as that shown in FIG. 4, generally includes a set of gear teeth on an inner circumferential surface thereof that are configured to mesh with corresponding teeth of the planet gears 53.

Referring now to FIGS. 5 and 6, detailed perspective views of one embodiment of the ring gear 56 and the annular torque support 50 according to the present disclosure are illustrated, respectively. As shown in FIG. 5, the ring gear 56 includes opposing inner and outer circumferential surfaces 57, 59 separated by side circumferential edges 63, 65. In addition, the side circumferential edges correspond to a rotor-side edge 63 and a generator-side edge 65. Like the conventional ring gear 51 illustrated in FIG. 4, the ring gear 56 of the present disclosure includes a plurality of gear teeth on the inner circumferential surface 57 so as to mesh one or more planet or sun gears of the gearbox 38. In contrast to the conventional ring gear 51 of FIG. 4, however, that only includes teeth on the inner circumferential surface thereof, the rotor-side edge 63 of the ring gear 56 of FIG. 5 also includes a first set 62 of circumferentially-spaced teeth configured to engage the torque support 50. For example, as shown in FIG. 6, the torque support 50 includes a generator-side surface 67 and a rotor-side surface 69. More specifically, the generator-side surface 67 includes a second set of circumferentially-spaced teeth 64 that correspond with the first set of teeth 62 of the ring gear 56. Thus, the first set of teeth 62 of the ring gear 56 are configured to engage with the second set of teeth 64 of the torque support 50 so as to transmit torque of the drivetrain assembly 30.

Referring now to FIGS. 7-12, various views of one embodiment of the drivetrain assembly 30 according to the present disclosure are illustrated. More particularly, FIG. 7 illustrates a perspective view of the drivetrain assembly 30 particularly illustrating the torque support 50 engaged with the ring gear 56 of the gearbox 38 via the first and second sets of teeth 62, 64, whereas FIG. 8 illustrates the drivetrain assembly 30 with the torque support 50 removed so as to further illustrate internal components of the ring gear 56. FIGS. 9-12 illustrate side, top, front, and back views of the drivetrain assembly 30, respectively.

As shown particularly in FIGS. 7, 9 and 10, the first set of teeth 62 of the ring gear 56 engage the second set of teeth 64 of the torque support 50 so as to transmit torque of the drivetrain assembly 30. In addition, one or more flexible components 60 are configured between the first and second sets of teeth 62, 64 so as to reduce vibrations or transmission of vibrations in the wind turbine 10, e.g. vibrations generated in the gearbox 38. For example, as shown particularly in FIGS. 10, 12, and 13, a plurality of flexible components 60 are configured between adjacent side walls of adjacent teeth of the engaged first and second sets of teeth 62, 64. In certain embodiments, the flexible components 60 may be constructed of one or more elastic or elastomeric materials that are configured to absorb vibrations and provide a more even gear mesh between the engaged teeth 62, 64. For example, as shown in FIG. 12, the flexible components 60 are mono-elastic components. In addition, the flexible components 60 may have any suitable shape so as to fit between the first and second sets of teeth 62, 64. For example, as shown, the flexible components 60 have a substantially rectangular shape. Also, all of the flexible components 60 may have the same shape or the individual shapes of each flexible component 60 may vary. In alternative embodiments, as shown in FIGS. 13 and 14, the flexible component(s) 60 may include a core member 76 sandwiched between two elastic members 72, 74. Further, as shown in FIG. 14, the core member 76 may define a first surface area, whereas each of the elastic members 72, 74 may define a second surface area. Thus, as shown in the illustrated embodiment, the first surface area may be greater than the second surface area so as to provide improved bonding between the elastic members 72, 74 and the core member 76, as well as lower degradation of the elastic members 72, 74. In such an embodiment, the elastic members 72, 74 may be constructed of different elastic materials. In this manner, the varying-material flexible component 60 is configured to achieve desired properties for both fatigue and extreme loading of the drivetrain assembly 30. In addition, the core member 76 may be constructed of any suitable material that allows for proper bonding of the varying elastic materials. For example, in one embodiment, the core member 76 may be constructed of a metallic material, such as, e.g. steel, aluminum, brass, nickel, titanium, or similar.

Referring particularly to FIGS. 7-10, the drivetrain assembly 30 may also include a retaining member 58 configured around the engaged first and second sets of teeth 62, 64 so as to radially retain the flexible component(s) 60 between engaged teeth 62, 64. More specifically, as shown in the illustrated embodiment, the retaining member 58 may correspond to a band that wraps around the outer circumference of the engaged first and second sets of teeth 62, 64 so as to radially retain the flexible component(s) 60 between the first and second sets of teeth 62, 64. The band may be constructed of any suitable material including rigid or flexible materials. More specifically, the band may be constructed of a metal, a metal alloy, a plastic material, an elastic material, or similar.

It should be understood that the flexible components as described herein are typically configured to react torque, as well as vertical and lateral loads. As such, still additional embodiments of the present disclosure may include an additional load-bearing component configured to support axial loads and/or the weight of the gearbox. For example, referring now to FIGS. 15-18, various side views of the drivetrain assembly 30 having one or more additional load-bearing components are illustrated. For example, as shown in FIG. 15, the load-bearing component may be a carrier down-wind bearing 75 configured with the main shaft 34 and the gearbox 38. Thus, the down-wind bearing 75 is configured to react axial loads, including but not limited to gearbox axial loads and/or gearbox weight moments through the main shaft 34 and out through the main shaft bearing 35.

In another embodiment, as shown in FIG. 16, the load-bearing component may be a load-bearing elastomer 73 mounted between the gearbox 38 and the bedplate support frame 48 so as to support axial loads and/or the gearbox weight. In additional embodiments, the load-bearing elastomer 73 may also be mounted at an angle so as to react the gearbox vertical weight and the axial gear loads. In still another embodiment, as shown in FIG. 17, the load-bearing component may be one or more axial bolts 77 that pass through the torque support 50 and into the ring gear 56. In addition, the axial bolts 77 may be configured to permit tangential movement between the torque support 50 and the ring gear 56.

Referring to FIG. 18, a flow diagram of one embodiment of a method 100 for assembling a drivetrain assembly of a wind turbine is illustrated. As shown, the method 100 includes a step 102 of machining a first set of circumferentially-spaced teeth into a rotor-side edge of a ring gear of a gearbox. Another step 104 includes machining a second set of circumferentially-spaced teeth into a generator-side surface of a torque support. The method 100 also includes engaging the ring gear with the torque support via the first and second set of teeth (step 106). Still another step 108 includes installing at least one flexible component between the first and second sets of teeth, wherein the at least one flexible component is configured to reduce transmission of vibrations generated in the gearbox.

In additional embodiments, the step 108 of installing the at least one flexible component between the first and second sets of teeth may include installing the flexible component between adjacent side walls of adjacent teeth of the engaged first and second sets of teeth. Further, the flexible component(s) may be installed between the first and second sets of teeth using any suitable technique. For example, in a particular embodiment, the flexible components may be installed by rotating the ring gear relative to the torque support in a first direction so as to create a plurality of first gaps between the first and second sets of teeth. Thus, a first set of the flexible components may be installed within the first gaps. The ring gear may again be rotated relative to the torque support in an opposite second direction so as to create a plurality of second gaps between the first and second sets of teeth. In particular, the ring gear may be rotated relative to the torque support in the second direction so as to compress the installed first set of flexible components. As such, a second set of the flexible components may then be installed within the second gaps. After releasing the installation torque/twist, the ring gear of the gearbox is configured to reach a tangential equilibrium position. As such, the retaining member or band may be installed around the outside of the teeth to prevent the flexible components from becoming displaced radially (i.e. the direction in which the flexible components were installed).

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drivetrain assembly for a wind turbine, the assembly comprising:
   a gearbox comprising a ring gear, the ring gear comprising opposing inner and outer circumferential surfaces and opposing side circumferential edges, said side circumferential edges comprising a first side edge and a second side edge, said first side edge comprising a first set of circumferentially-spaced teeth;
   an annular torque support comprising a first side surface and a second side surface, the second side surface comprising a second set of circumferentially-spaced teeth, wherein the first set of teeth engage the second set of teeth; and,
   at least one flexible component configured between the first and second sets of teeth, wherein at least one flexible component is configured to reduce vibrations in the wind turbine.

2. The drivetrain assembly of claim 1, wherein the at least one flexible component is configured between adjacent side walls of adjacent teeth of the engaged first and second sets of teeth.

3. The drivetrain assembly of claim 1, further comprising a retaining member configured around the engaged first and second sets of teeth so as to radially retain the at least one flexible component between the first and second sets of teeth.

4. The drivetrain assembly of claim 3, wherein the retaining member comprises a circumferential band wrapped around the engaged first and second sets of teeth.

5. The drivetrain assembly of claim 1, further comprising a bedplate support frame configured to support the gearbox and the torque support, wherein the torque support is integral with the bedplate support frame.

6. The drivetrain assembly of claim 5, further comprising an additional load-bearing component configured to support at least one of axial loads of the drivetrain assembly or a weight of the gearbox.

7. The drivetrain assembly of claim 6, wherein the load-bearing component comprises at least one of a down-wind bearing, one or more elastomers configured between the gearbox and bedplate support frame, or one or more axial bolts passing through the torque support and the ring gear.

8. The drivetrain assembly of claim 1, wherein the at least one flexible component comprises substantially rectangular shape so as to correspond to a shape of the first and second sets of teeth.

9. The drivetrain assembly of claim 1, wherein the at least one flexible component comprises an elastic material.

10. The drivetrain assembly of claim 1, wherein the at least one flexible component comprises a core member sandwiched between two elastic members, each of the elastic members being constructed of a different elastic material and the core member being constructed of a metallic material, wherein the metallic material comprises at least one of steel, aluminum, brass, nickel, or titanium.

11. The drivetrain assembly of claim 9, wherein the core member defines a first surface area and each of the elastic members defines a second surface area, wherein the first surface area is greater than the second surface area.

12. A wind turbine, comprising:
   a tower;
   a nacelle mounted atop the tower;
   a rotor;
   a gearbox positioned within the nacelle and comprising a ring gear, the ring gear comprising opposing inner and outer circumferential surfaces separated by side circumferential edges, the side circumferential edges comprising a first side edge and a second side edge, the first side edge comprising a first set of circumferentially-spaced teeth;
   a rotor shaft rotatably coupling the rotor o the gearbox;
   a bedplate support frame configured to support the gearbox and the rotor shaft;
   an annular torque support engaged with the gearbox and configured atop the bedplate support frame, the torque support comprising a first side surface and a second side surface, the second side surface comprising a second set of circumferentially-spaced teeth, wherein the first set of teeth engage the second set of teeth so as to couple the ring gear to the torque support; and,
   a plurality of flexible components configured between the first and second sets of teeth, wherein the plurality of flexible components are configured to reduce vibrations in the wind turbine.

* * * * *